United States Patent

Sogawa et al.

Patent Number: 5,831,552
Date of Patent: Nov. 3, 1998

[54] TRAFFIC INFORMATION DISPLAY UNIT

[75] Inventors: Toshio Sogawa; Katsuji Doi; Katsuro Hayami; Toshiyuki Matsuo; Ikuo Saga; Shigeki Nakane, all of Tokyo, Japan

[73] Assignee: Mitsubishi Denki Kabushiki Kaisha, Tokyo, Japan

[21] Appl. No.: 838,292

[22] Filed: Apr. 17, 1997

[30] Foreign Application Priority Data

Apr. 19, 1996 [JP] Japan ................................ 8-098802

[51] Int. Cl.$^6$ ................................................. G08G 1/123
[52] U.S. Cl. ........................... 340/995; 340/905; 340/990
[58] Field of Search ................................. 340/995, 990, 340/905, 988; 701/200, 201, 210, 211

[56] References Cited

U.S. PATENT DOCUMENTS

| | | | |
|---|---|---|---|
| 4,409,583 | 10/1983 | Dahan et al. | 340/995 |
| 5,182,555 | 1/1993 | Sumner | 340/905 |
| 5,257,023 | 10/1993 | Furuya | 340/995 |
| 5,289,184 | 2/1994 | Suzuki | 340/905 |
| 5,293,163 | 3/1994 | Kakihara et al. | 340/995 |
| 5,396,429 | 3/1995 | Hanchett | 701/117 |
| 5,504,482 | 4/1996 | Schreder | 340/995 |
| 5,694,122 | 12/1997 | Nakada | 340/990 |

FOREIGN PATENT DOCUMENTS

| | | |
|---|---|---|
| 0 720 137 A2 | 7/1996 | European Pat. Off. . |
| 7-57187 | 3/1995 | Japan . |
| 2 304 894 | 3/1997 | United Kingdom . |
| WO 95/24029 | 9/1995 | WIPO . |

Primary Examiner—Jeffery A. Hofsass
Assistant Examiner—Benjamin C. Lee
Attorney, Agent, or Firm—Sughrue, Mion, Zinn, Macpeak & Seas, PLLC

[57] ABSTRACT

A traffic information display unit having a road type associated traffic information display mode control unit for altering the display mode of a traffic information representation in accordance with the type of a road associated with the traffic information. Alternatively, it may have a traffic information additional symbol adding unit for adding a traffic information additional symbol indicating the direction of a road associated with an accident/regulation information. Those make it possible to solve conventional problems in that a driver must manipulate a switch each time he wishes to distinguish the traffic information representation of an expressway from that of a local road, or that he cannot recognize lane in which the accident/regulation takes place because the traffic information representation of the accident/regulation information was a simple symbol on the road without showing the direction.

13 Claims, 14 Drawing Sheets

TRAFFIC INFORMATION DISPLAY UNIT

BACKGROUND OF THE INVENTION

1. Field of the Invention

The present invention relates to a traffic information display unit for showing received traffic information on a map displayed on the screen of a display.

2. Description of Related Art

FIG. 17 is a block diagram showing a conventional traffic information display unit as a vehicle information display unit disclosed in Japanese patent application laying open No. 7-57187, for example. In this figure, the reference numeral 10 designates a map CD-ROM (compact disk read-only memory) for storing map information; 12 designates a sensor portion including a bearing sensor for detecting the traveling direction of the vehicle with a geomagnetism sensor, and an odometer for measuring mileage in response to the number of revolutions of its wheels; 14 designates a GPS (global positioning system) for acquiring traveling information on the vehicle together with the sensor portion 12; 16 designates an external information receiver consisting of an FM multiplex broadcast receiver or the like for receiving external information such as traffic congestion information; 18 designates a display such as a cathode-ray tube or a liquid crystal display for showing display data such as the external information data like map information and the congestion information; 20 designates an electronic display controller for controlling the display 18; 22 designates operation switches for switching information to be displayed on the display 18; and 24 designates an electronic main controller for controlling the display of the vehicle information by controlling the input of the vehicle information, various computing processings, and the electronic display controller 20.

Next, the operation will be described.

FIG. 18 illustrates examples of a picture on the display 18 of the conventional traffic information display unit. The pictures show traffic information superimposed on the map information read from the map CD-ROM 10, in which the traffic information is formed based on the external information like congestion information fed from the external information receiver 16. FIG. 18 (a) shows the traffic information representation of the entire roads regardless of an expressway or local roads.

A driver can obtain the picture as shown in FIG. 18(b), in which the traffic information representation of the local roads is deleted, by manipulating a selection switch for express mode display in the operation switches 22, thereby deleting, by the electronic main controller 24, the traffic information representation other than that of the expressway from the traffic information representation in the picture displayed on the display 18. This makes it easier for the driver to recognize the traffic information representation of the expressway as needed.

The conventional traffic information display unit with such an arrangement has a problem in that the driver must operate one of the operation switches 22 each time he wishes to distinguish the traffic information representation of the expressway from that of the local roads by deleting the unnecessary information from the picture of an area in which the expressway and the local roads aggregate, for example.

In addition, although it is easy for the driver to recognize in the conventional traffic information display unit whether the congestion occurs in the up or down lane because the traffic information representation of the congestion is displayed along the road in the form of a congestion section and its direction, it is difficult to recognize from the displayed traffic information representation whether an accident/regulation occurs in the up or down lane because the traffic information representation of the accident/regulation such as speed regulation due to an accident, passage regulation like road closing, or chain regulation is displayed in the form of symbolic traffic information representation such as a mark on the corresponding road.

SUMMARY OF THE INVENTION

The present invention is achieved to solve the foregoing problems. It is therefore an object of the present invention to provide a traffic information display unit which enables the driver to easily recognize the traffic information in connection with road types or up/down lanes, without requiring any extra one by one manual operations.

According to the present invention, there is provided a traffic information display unit comprising road type associated traffic information display mode control means for altering a display mode of a traffic information representation in accordance with the type of a road associated with the traffic information when displaying the traffic information representation. This offers an advantage that a driver can easily identify the road type associated with the traffic information by merely watching the traffic information representation, and thus recognize the traffic information easily in connection with the road.

In a preferred embodiment of the present invention, the road type associated traffic information display mode control means alters the display mode of the traffic information representation by changing a type of a line which is used to display the traffic information representation and which is placed along the road associated with the traffic information. This offers an advantage that a driver can easily identify the road type associated with the traffic information by the difference in the line type of the traffic information representation by merely watching it, and thus recognize the traffic information easily in connection with the road.

In a preferred embodiment of the present invention, the road type associated traffic information display mode control means alters the display mode of the traffic information representation by changing the color of a line placed along the road associated with the traffic information to display the traffic information representation. This offers an advantage that a driver can easily identify the road type associated with the traffic information by the difference in the color of the traffic information representation by merely watching it, and thus to recognize the traffic information easily in connection with the road.

In a preferred embodiment of the present invention, the traffic information representation corresponding to the congestion information is displayed along the road associated with the congestion information, and the display mode of the traffic information representation is altered by changing the type or color of the line of the traffic information representation. This offers an advantage that a driver can easily identify the road type associated with the congestion information by the difference in the type or color of the line of the traffic information representation by merely watching it, and thus recognize the congestion information easily in connection with the road.

In a preferred embodiment of the present invention, the road type associated traffic information display mode control means alters the display mode of the traffic information representation by changing the color of a symbol which is placed at a position associated with the traffic information. This offers an advantage that a driver can easily identify the road type associated with the traffic information by the difference in the color of the traffic information representation by merely watching it, and thus recognize the traffic information easily in connection with the road.

In a preferred embodiment of the present invention, the alteration of the display mode of the traffic information representation is carried out by changing the color of the traffic information representation marked at a position corresponding to the accident/regulation information. This offers an advantage that a driver can easily identify the road type associated with the accident/regulation information by the difference in the color of the traffic information representation by merely watching it, and thus recognize the accident/regulation information easily in connection with the road.

According to the present invention, there is provided a traffic information display unit comprising road type associated traffic information additional symbol display mode control means for altering, in accordance with the type of a road associated with the traffic information, a display mode of a traffic information additional symbol displayed in addition to the traffic information representation when displaying it. This offers an advantage that a driver can not only recognize the contents of the traffic information from the traffic information representation, but also identify the road type corresponding to the traffic information easily by merely watching the traffic information additional symbol, and thus recognize the traffic information easily in connection with the road.

In a preferred embodiment of the present invention, the traffic information additional symbol is a road type indicator representing the type of the road associated with the traffic information. This offers an advantage that even a driver who is not accustomed to such display can easily and clearly identify the type of the road corresponding to the traffic information by merely watching the road type indicator, and thus recognize the traffic information simply and distinctly in connection with the road.

According to the present invention, there is provided a traffic information display unit comprising traffic information additional symbol adding means for adding a traffic information additional symbol indicating the direction of a road associated with the accident/regulation information when displaying an accident/regulation mark. This offers an advantage that a driver can not only recognize the presence of an accident/regulation from the accident/regulation mark, but also easily recognize whether the accident/regulation occurs in the up or down lane.

In a preferred embodiment of the present invention, the traffic information additional symbol adding means adds as the traffic information additional symbol an accident/regulation section indicating line displayed along the road associated with the accident/regulation information to indicate a section of the displayed accident/regulation and the direction of the road. This offers an advantage that a driver can not only recognize the presence of an accident/regulation from the accident/regulation mark, but also easily recognize the section and the lane in which the accident/regulation takes place from the accident/regulation section indicating line.

In a preferred embodiment of the present invention, the traffic information additional symbol adding means adds as the traffic information additional symbol an accident/regulation direction indicator displayed near the accident/regulation mark to indicate a direction of the road associated with the accident/regulation information. This offers an advantage that a driver can not only recognize the presence of an accident/regulation from the accident/regulation mark, but also easily recognize whether the accident/regulation takes place in the up or down lane from the accident/regulation direction indicator.

In a preferred embodiment of the present invention, the traffic information display unit further comprises road type associated traffic information additional symbol display mode control means for altering a display mode of the traffic information additional symbol in accordance with the type of a road associated with the accident/regulation information. This makes it possible to provide a traffic information display unit which enables a driver to recognize not only the presence of the accident/regulation from the accident/regulation mark, but also whether the accident/regulation occurs in the up or down lane. In addition, this offers an advantage that a driver can easily identify the type of a road subjected to the accident/regulation from the display mode of the traffic information additional symbol by merely watching it, and thus recognize the accident/regulation information distinctly in connection with the road.

DETAILED DESCRIPTION OF THE PREFERRED EMBODIMENTS

The invention will now be described with reference to the accompanying drawings.

EMBODIMENT 1

Figure 1:
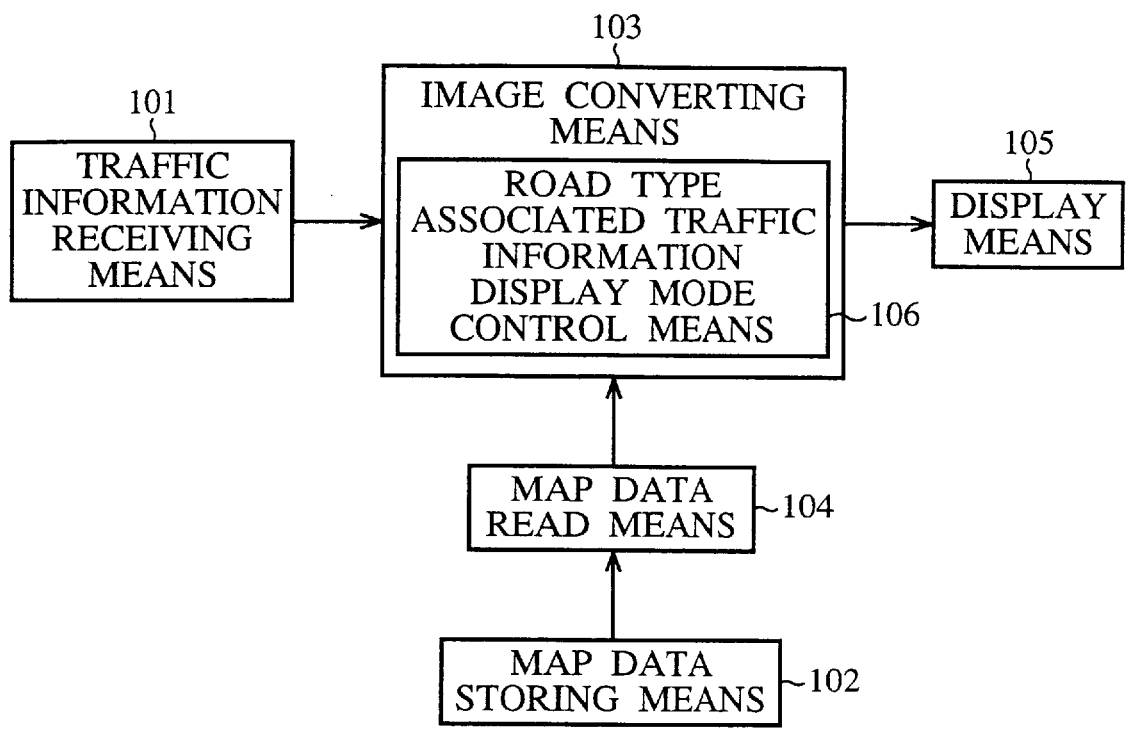
FIG. 1 is a functional block diagram showing an embodiment 1 of a traffic information display unit in accordance with the present invention.

FIG. 1 is a functional block diagram showing an embodiment 1 of a traffic information display unit in accordance with the present invention. In this figure, the reference numeral 101 designates a traffic information receiving means for receiving traffic information such as congestion information transmitted by FM multiplex broadcast or the like; 102 designates a map data storing means for storing map data like road information; 103 designates an image converting means for converting the map data stored in the map data storing means 102 and the traffic information received by the traffic information receiving means 101 to generate a display signal for displaying an image including the traffic information and the like; 104 designates a map data read means for reading the map data designated by the image converting means 103 from the map data storing means 102; and 105 designates a display means for displaying an image including the road map and traffic information representation in response to the display signal fed from the image converting means 103.

The reference numeral 106 designates a road type associated traffic information display mode control means provided in the image converting means 103 for changing the display mode of the traffic information representation in accordance with the type of the road associated with the traffic information when displaying the traffic information representation of the road map on the display means 105 on the basis of the traffic information received by the traffic information receiving means 101.

Figure 2:
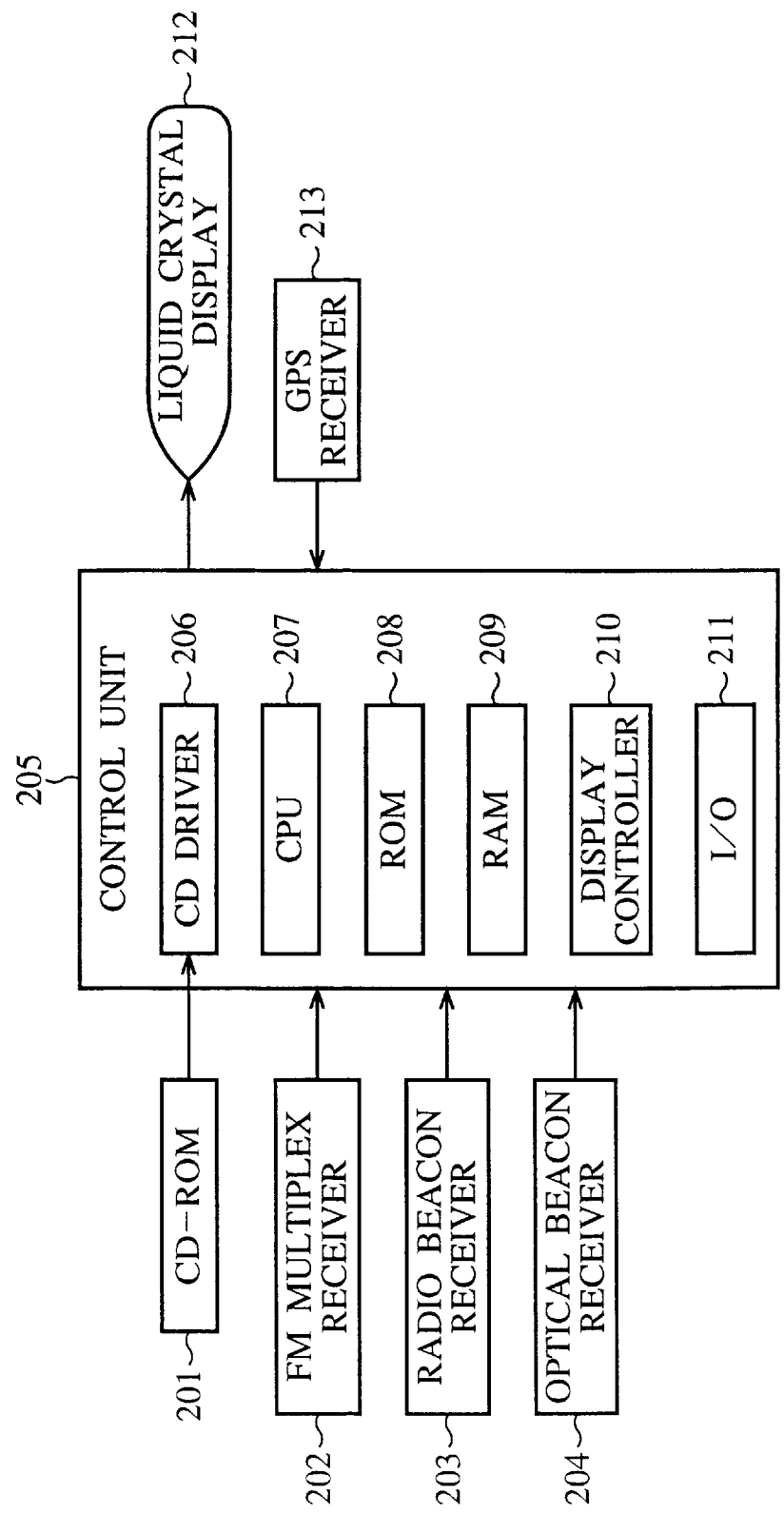
FIG. 2 is a block diagram showing an example of a hardware configuration of the embodiment 1 of the traffic information display unit in accordance with the present invention.

FIG. 2 is a block diagram showing an example of a hardware configuration of the embodiment 1 of the traffic information display unit in accordance with the present invention, in which the reference numeral 201 designates a CD-ROM (compact disk read-only memory) corresponding to the map data storing means 102 of FIG. 1.

The reference numeral 202 designates an FM multiplex receiver for receiving FM multiplex broadcasts, 203 designates a radio beacon receiver for receiving information sent out of the radio beacon, and 204 designates an optical beacon receiver for receiving information sent out of an optical beacon, which correspond to the traffic information receiving means 101 in FIG. 1.

The reference numeral 205 designates a display control unit comprising a CD driver 206, a CPU (central processing unit) 207, a ROM (read-only memory) 208, a RAM (random access memory) 209, a display controller 210 for carrying out display control of a liquid crystal display 212, and an I/O (input/output) unit 211 for performing input and output with the outside. The control unit 205 corresponds to the image converting means 103 and map data read means 104 in FIG. 1, and controls various computations and the system in its entirety. In FIG. 1 the functions of the image converting means 103 including the function of the road type associated traffic information display mode control means 106 can be achieved using the CPU 207, ROM 208 and RAM 209.

The reference numeral 212 designates a liquid crystal display for displaying the display data fed from the control unit 205, which corresponds to the display means 105 in FIG. 1, and 213 designates a GPS (global positioning system) for detecting the current position of the vehicle.

Next, the operation of the embodiment 1 will be described.

In the embodiment 1, the traffic information display unit will be described which displays the congestion information as an example of the traffic information. The embodiment 1 of the traffic information display unit alters the display mode of the traffic information representation associated with the congestion information in accordance with the type of a congested road when displaying the congestion information on the map.

Figure 4:
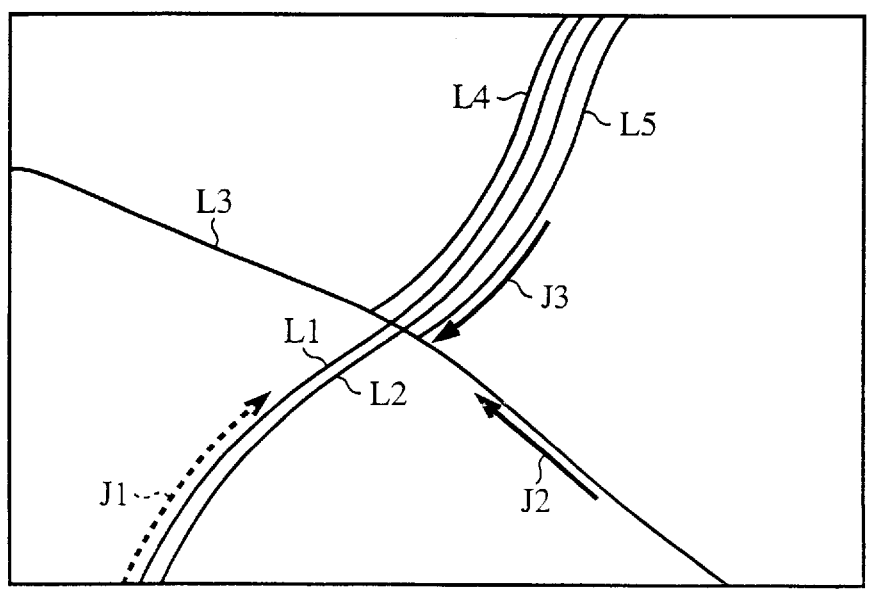
FIG. 4 is a diagram illustrating an example of a picture on a display means in the embodiment 1 of the traffic information display unit in accordance with the present invention.
Figure 3:
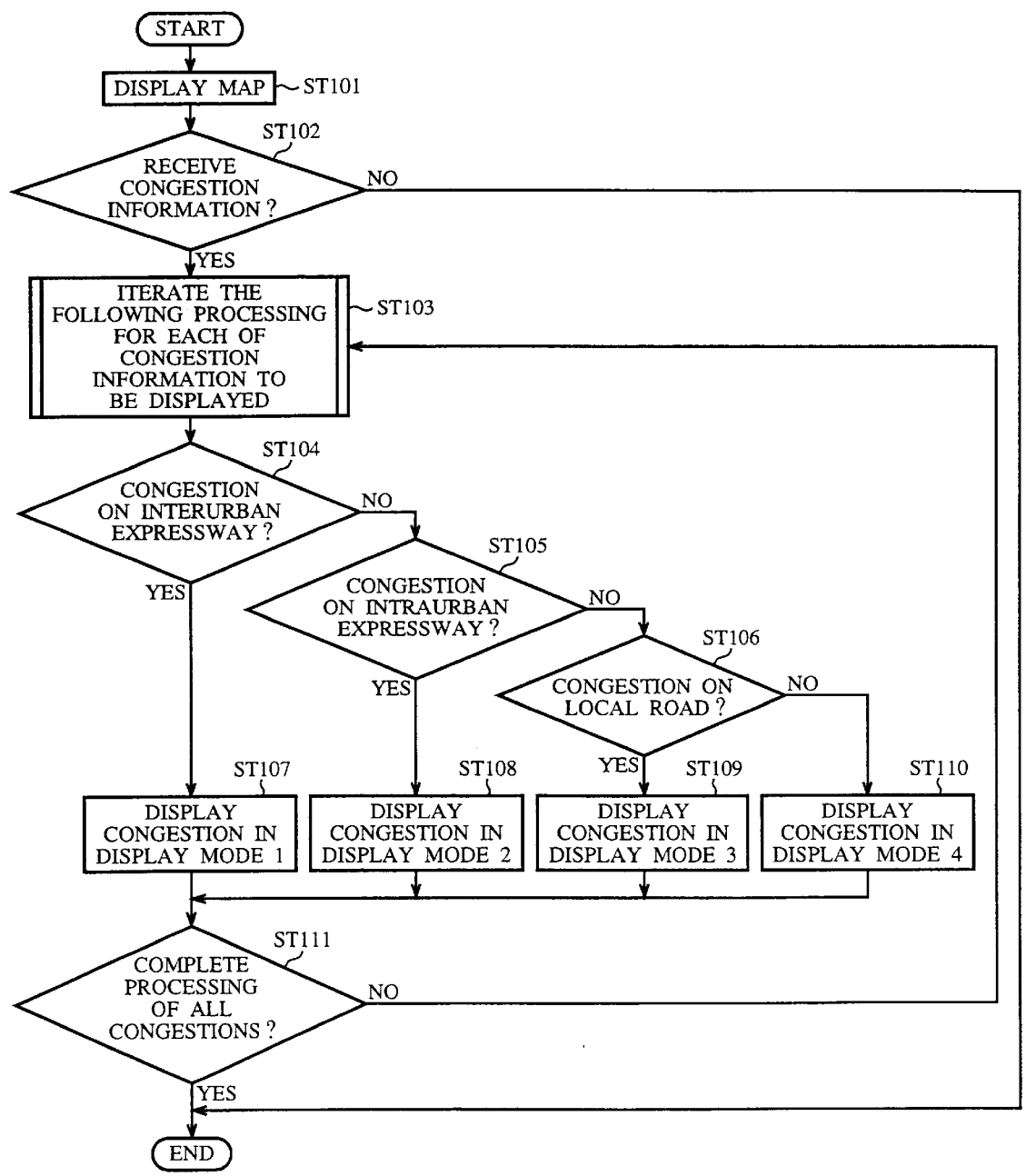
FIG. 3 is a flowchart illustrating the processing flow of the embodiment 1 of the traffic information display unit in accordance with the present invention.

FIG. 3 is a flowchart showing the processing flow of the embodiment 1 of the traffic information display unit in accordance with the present invention, and FIG. 4 is a diagram showing an example of a picture on the display means 105. In FIG. 4, the reference characters L1 and L2 each designate an interurban expressway (road); L3, L4 and L5 each designate a local road (road), J1 designates a congestion indicating line (traffic information representation) representing the congestion section on the interurban expressway L1 and the degree of the congestion, and J2 and J3 each designate a congestion indicating line (traffic information representation) representing the congestion section on the local roads L3 and L4 and the degree of the congestions. The operation of the embodiment will now be described referring to FIGS. 3 and 4.

First, at step ST101, the map data of a displayed area and its neighborhood is read from the map data storing means 102 so that the road map is displayed on the screen of the display means 105. Then, the congestion information display processing is carried out at and after step ST102.

First, at step ST102, a decision is made whether the traffic information received by the traffic information receiving means 101 includes the congestion information or not, and if it includes the congestion information, the processing proceeds to step ST103, whereas if it does not include the congestion information, the congestion information display processing is terminated.

At and after step ST103, the processing at and after step ST104 is carried out for each of the congestion information which is received by the traffic information receiving means 101 and which is to be shown on the road map displayed on the screen of the display means 105 at step ST101.

For example, the processing at and after step ST104 is carried out as follows for the congestion indicating line J0 representing the congestion information on a particular road L0.

First, at step ST104, a decision is made whether the type of the road L0 is an interurban expressway or not. If the type of the road L0 is the interurban expressway, the processing proceeds to step ST107, and if not, it proceeds to step ST105.

Then, at step ST105, a decision is made whether the type of the road L0 is an intraurban expressway or not. If the type of the road L0 is the intraurban expressway, the processing proceeds to step ST108, and if not, it proceeds to step ST106.

Subsequently, at step ST106, a decision is made whether the type of the road L0 is a local road or not. If the type of the road L0 is the local road, the processing proceeds to step ST109, and if not, it proceeds to step ST110.

It is possible for the foregoing steps ST104–ST106 to use either the information stored in the map data storing means 102 or the link division information included in the congestion information received by the traffic information receiving means 101 for deciding the type of the road L0. Here, the link division is a road division provided for the traffic information, which consists of four types of roads: the interurban expressway, intraurban expressway, local roads and the remaining roads.

Subsequently, the congestion indicating line J0 is displayed in the display mode corresponding to the road type at one of the steps ST107–ST110, then the processing proceeds to step ST111.

In this case, the congestion indicating line J0 is displayed in the display mode 1 (dashed-and-two-dotted line, for example) at step ST107, in the display mode 2 (dashed-and-dotted line, for example) at step ST108, in the display mode 3 (broken line, for example) at step ST109, and in the display mode 4 (solid line, for example) at step ST110.

It is possible to provide the different road types with the same congestion indication such as representing the display modes 1 and 2 at steps ST107 and ST108 using a broken line, and display modes 3 and 4 at steps ST109 and ST110 using a solid line.

After that, at step ST111, a decision is made whether the processing at and after step ST104 has been completed with the entire congestion information to be displayed. If the decision result is positive, the congestion information display processing is completed. If there remains some congestion information unprocessed, the congestion information undergoes the processing at and after step ST104.

According to the embodiment 1 described above, the display mode of the congestion indicating lines representing the congestion information is altered in accordance with the type of the congested road. This makes it possible for the driver to easily recognize the type of the congested road by merely watching the congestion indicating line as the traffic information representation. Thus, a traffic information display unit can be provided which enables the driver to identify the congestion information easily in connection with the roads.

Although the display mode of the congestion information is altered in the example described above, the display mode of other traffic information such as accident/regulation information, parking lot information, travel time information about a particular section can also be altered in accordance with the road types, providing similar effects. In addition, although the display mode is changed by altering the type of the congestion indicating line, it can also be achieved by altering the color of the line, resulting in the same effects.

EMBODIMENT 2

Although the foregoing embodiment 1 alters the display mode of the traffic information representation such as congestion information in accordance with the type of the road associated with the traffic information, it is not essential. For example, it is possible to alter in accordance with the road type a traffic information additional symbol which is displayed in addition to the traffic information representation when displaying it.

Figure 5:
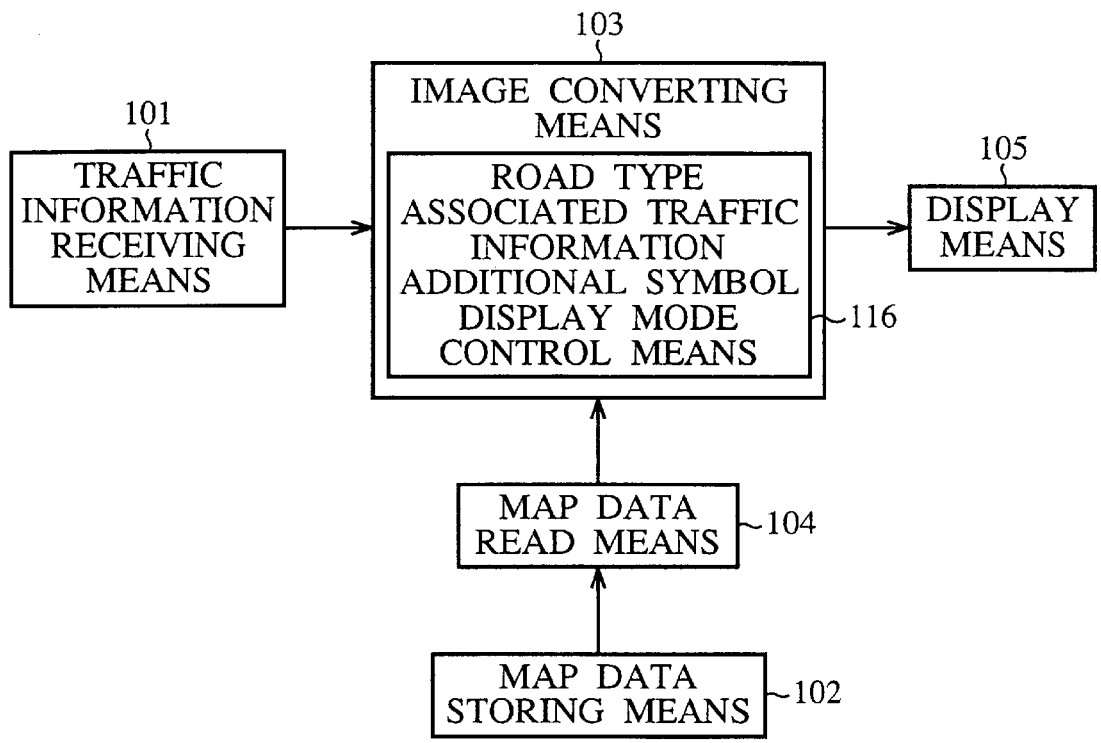
FIG. 5 is a functional block diagram showing an embodiment 2 of the traffic information display unit in accordance with the present invention.

FIG. 5 is a functional block diagram showing an embodiment 2 of a traffic information display unit in accordance with the present invention. In this figure, the reference numeral 116 designates a road type associated traffic information additional symbol display mode control means provided in the image converting means 103 for altering, in accordance with the road type associated with the traffic information, the display mode of the traffic information additional symbol displayed in addition to the traffic information representation when displaying it on the map on the display means 105 in response to the traffic information received by the traffic information receiving means 101. Its functions are implemented by the image converting means 103 comprising the CPU 207, ROM 208 and RAM 209 as the functions of the road type associated traffic information display mode control means shown in FIG. 1. In FIG. 5, the same or corresponding portions to those of FIG. 1 are designated by the same reference numerals and the description thereof is omitted here.

Next, the operation of the embodiment 2 will be described.

Figure 7:
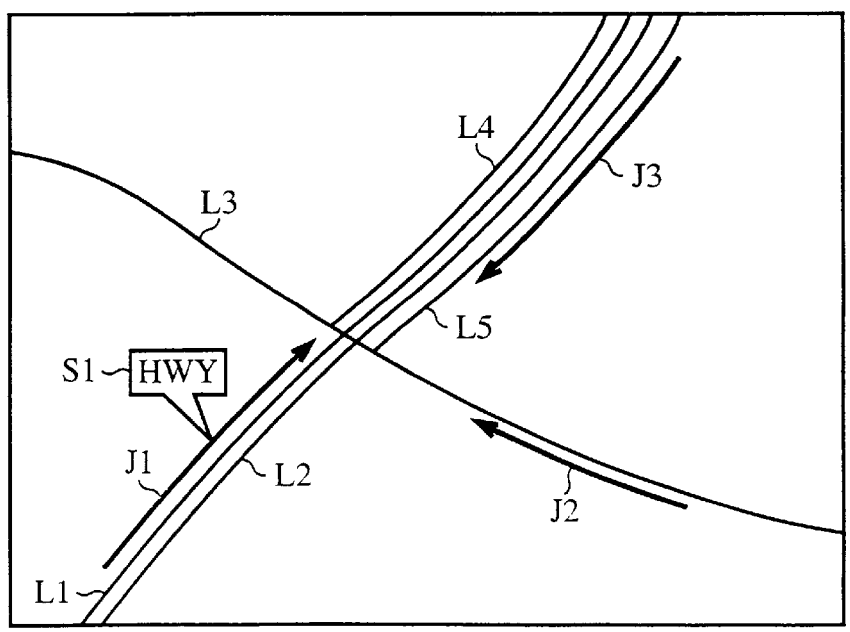
FIG. 7 is a diagram illustrating an example of a picture on a display means in the embodiment 2 of the traffic information display unit in accordance with the present invention.
Figure 6:
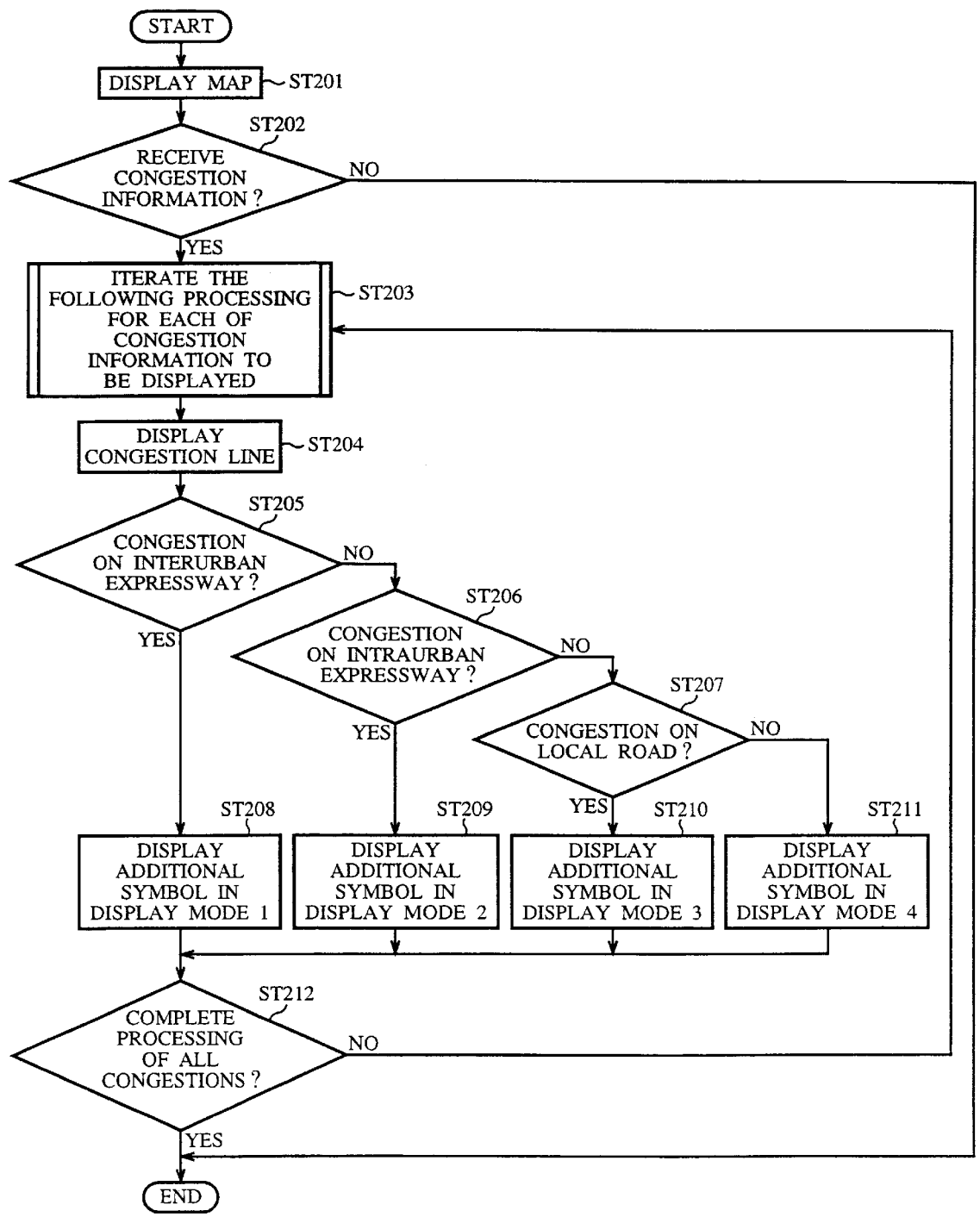
FIG. 6 is a flowchart illustrating the processing flow of the embodiment 2 of the traffic information display unit in accordance with the present invention.

FIG. 6 is a flowchart showing the processing flow of the embodiment 2 of the traffic information display unit in accordance with the present invention, and FIG. 7 is a diagram showing an example of a picture on the display means 105. In FIG. 7, the reference characters L1 and L2 each designate an interurban expressway (road); L3, L4 and L5 each designate a local road (road), J1 designates a congestion indicating line (traffic information representation) representing the congestion section on the interurban expressway L1 and the degree of the congestion, J2 and J3 each designate a congestion indicating line (traffic information representation) representing the congestion section on the local roads L3 and L5 and the degree of the congestions, and S1 designates a road type indicator (traffic information additional symbol) displayed in addition to the congestion indicating line J1 to indicate the type of the road. The operation of the embodiment will now be described with reference to FIGS. 6 and 7.

First, at step ST201, the map data of a displayed area and its neighborhood is read from the map data storing means 102 so that the road map is displayed on the screen of the display means 105. Then, the congestion information display processing is carried out at and after step ST202.

First, at step ST202, a decision is made whether the traffic information received by the traffic information receiving means 101 includes the congestion information or not, and if it includes the congestion information, the processing proceeds to step ST203, whereas if it does not include the congestion information, the congestion information display processing is terminated.

At and after step ST203, the processing at and after step ST204 is carried out for each of the congestion information which is received by the traffic information receiving means 101 and which is to be shown on the road map displayed on the screen of the display means 105 at step ST201.

For example, the processing at and after step ST204 is carried out as follows for the congestion information on a particular road L0.

First, at step ST204, the congestion indicating line J0 is displayed along the road L0.

Next, at step ST205, a decision is made whether the type of the road L0 is an interurban expressway or not. If the type of the road L0 is the interurban expressway, the processing proceeds to step ST208, and if not, it proceeds to step ST206.

Then, at step ST206, a decision is made whether the type of the road L0 is an intraurban expressway or not. If the type of the road L0 is the intraurban expressway, the processing proceeds to step ST209, and if not, it proceeds to step ST207.

Subsequently, at step ST207, a decision is made whether the type of the road L0 is a local road or not. If the type of the road L0 is the local road, the processing proceeds to step ST210, and if not, it proceeds to step ST211.

Subsequently, the road type symbol SO is displayed in a display mode corresponding to the road type in such a manner that it is attached to the congestion indicating line J0 at one of the steps ST208–ST211, then the processing proceeds to step ST212.

In this case, the road type symbol S0 "HWY" indicating an expressway is added, for example, in the display modes 1 and 2 at steps ST208 and ST209, and the road type symbol S0 is not added in the display modes 3 and 4 at steps ST210 and ST211. Alternatively, the road type symbol S0 can be added to each road type.

After that, at step ST212, a decision is made whether the processing at and after step ST204 has been completed with the entire congestion information to be displayed. If the decision result is positive, the congestion information display processing is completed. If there remains some congestion information unprocessed, the congestion information undergoes the processing at and after step ST204.

According to the embodiment 2 described above, the display mode of the traffic information additional symbol attached to the congestion indicating line displayed as the traffic information representation is altered in accordance with the type of the congested road. This makes it possible for the driver to easily recognize the congested road type by merely watching the traffic information additional symbol as the road type indicator. Thus, a traffic information display unit can be provided which enables the driver to identify the congestion information easily in connection with the roads.

Although the traffic information additional symbol associated with the road type is added to the traffic information representation of the congestion information in the description above, a traffic information additional symbol corresponding to the road type can also be added to other information such as accident/regulation information, parking lot information or travel time information about a particular section, providing similar effects. In addition, although the road type indicator representing the type of the road is used above, a traffic information additional symbol indicating other attributes can also be added to the traffic information representation in a display mode corresponding to the road types, resulting in the same effects.

EMBODIMENT 3

Although the traffic information additional symbol is added to the traffic information representation showing the congestion information in the foregoing embodiment 2, it can be added to the accident/regulation information to be displayed.

The traffic information representation of the congestion information is usually displayed such that a congestion section is shown with its direction along the road, and hence it is easy for a driver to recognize from the traffic information representation whether the congestion occurs in the up or down lane. However, the traffic information representation concerning the accident/regulation information such as speed regulation due to accident or the like, traffic regulation like the suspension of traffic, or chain regulation is usually displayed in the form of a symbol-like traffic information representation such as a mark placed on the corresponding road. Accordingly, it is not easy for the driver to recognize from the traffic information representation whether the accident/regulation occurs in the up or down lane. In view of this, in the present embodiment 3, an accident/regulation section indicating line representing the accident/regulation section and its direction is displayed as the traffic information additional symbol in addition to the accident/regulation mark displayed as the traffic information representation associated with the congestion information to represent the contents of the accident/regulation.

In this embodiment 3, the display mode of the traffic information additional symbol is not altered in accordance with the road type.

Figure 8:
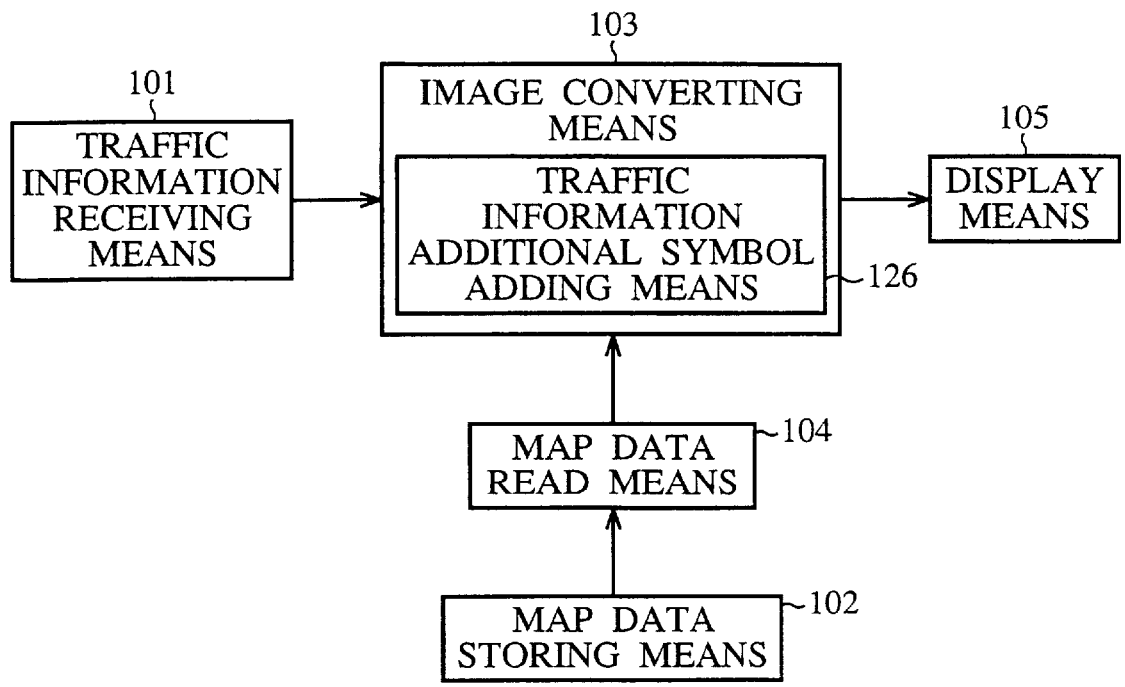
FIG. 8 is a functional block diagram showing an embodiment 3 of the traffic information display unit in accordance with the present invention.

FIG. 8 is a functional block diagram showing an embodiment 3 of a traffic information display unit in accordance with the present invention. In this figure, the reference numeral 126 designates a traffic information additional symbol adding means provided in the image converting means 103 for adding an accident/regulation section indicating line, which represents the accident/regulation section with its direction to the road corresponding to the accident/regulation information, as the traffic information additional symbol when displaying the accident/regulation mark representing the contents of the accident/regulation as the traffic information representation on the map on the display means 105 in response to the traffic information received by the traffic information receiving means 101. Its functions are implemented by the image converting means 103 comprising the CPU 207, ROM 208 and RAM 209 as the functions of the road type associated traffic information display mode control means 106 shown in FIG. 1. In FIG. 8, the same or corresponding portions to those of FIG. 1 are designated by the same reference numerals and the description thereof is omitted here.

Next, the operation of the embodiment 3 will be described.

Figure 10:
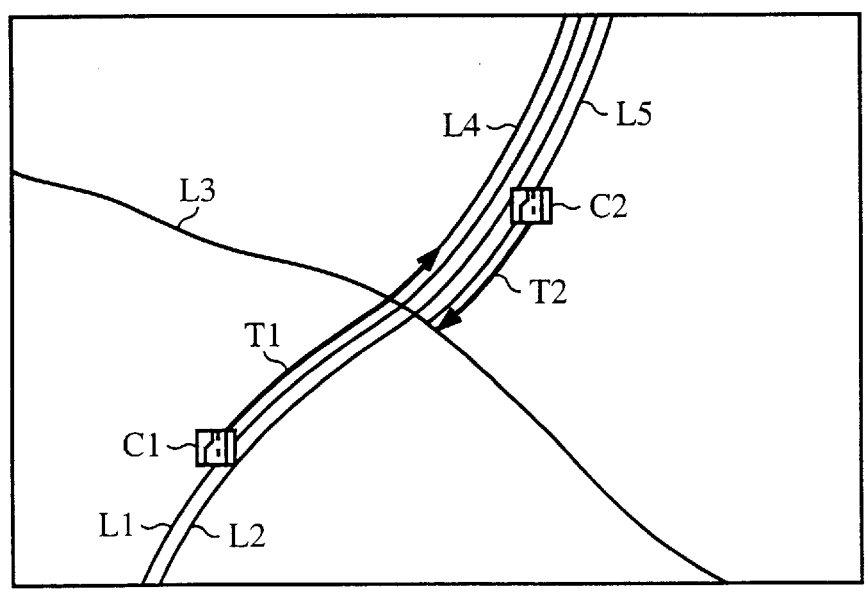
FIG. 10 is a diagram illustrating an example of a picture on a display means in the embodiment 3 of the traffic information display unit in accordance with the present invention.
Figure 9:
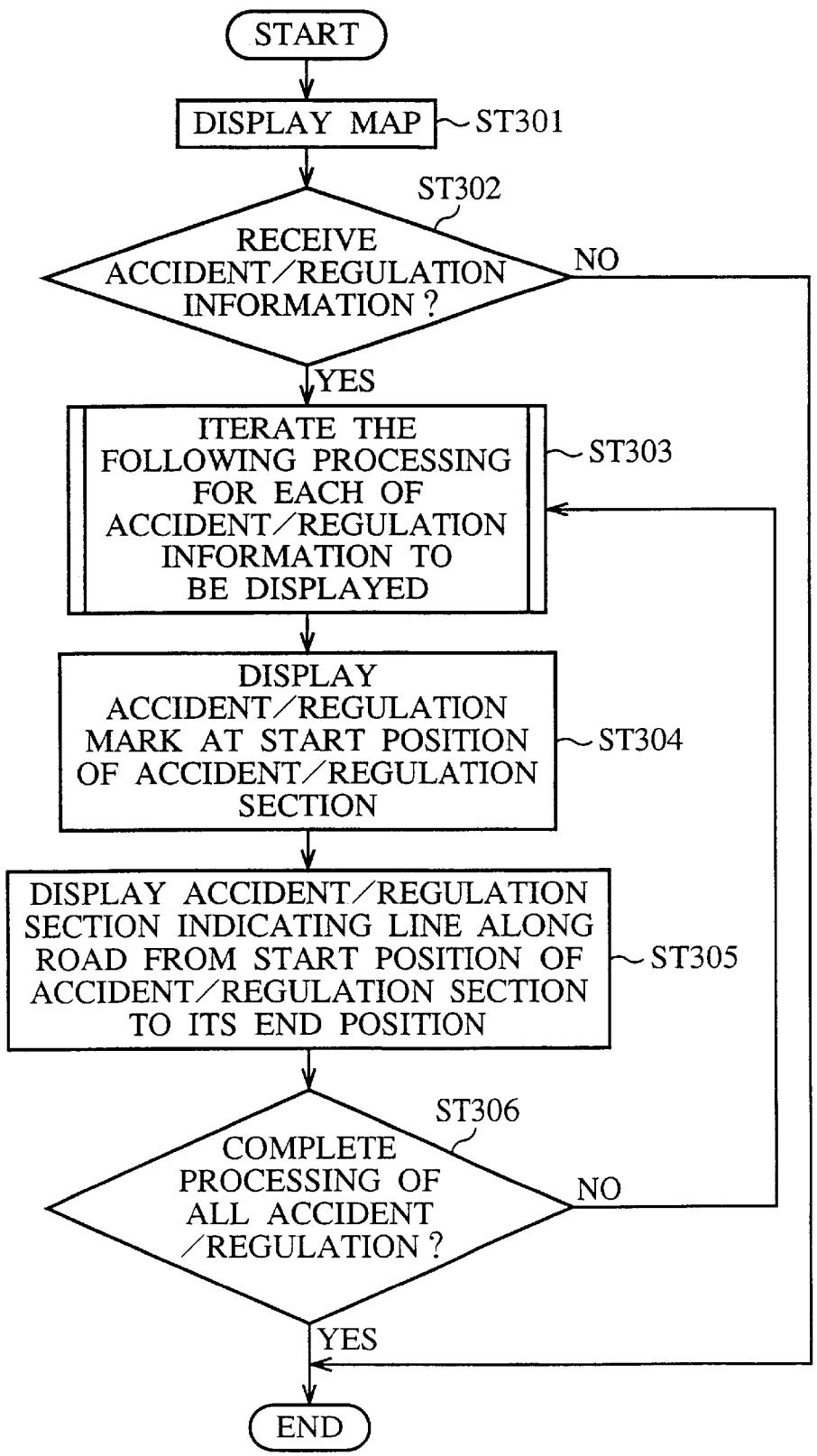
FIG. 9 is a flowchart illustrating the processing flow of the embodiment 3 of the traffic information display unit in accordance with the present invention.

FIG. 9 is a flowchart showing the processing flow of the embodiment 3 of the traffic information display unit in accordance with the present invention, and FIG. 10 is a diagram showing an example of a picture on the display means 105. In FIG. 10, the reference characters L1 and L2 each designate an interurban expressway (road); L3, L4 and L5 each designate a local road (road), C1 designates an accident/regulation mark (traffic information representation) representing the contents of the accident/regulation of the interurban expressway L1, T1 designates an accident/regulation section indicating line (traffic information additional symbol) representing the accident/regulation section of the interurban expressway L1 and its direction, C2 designates an accident/regulation mark (traffic information representation) representing the contents of the accident/regulation of the local road L5, and T2 designates an accident/regulation section indicating line (traffic information additional symbol) representing the accident/regulation section of the local road L5 and its direction. The operation of the embodiment will now be described referring to FIGS. 9 and 10.

First, at step ST301, the map data of a displayed area and its neighborhood is read from the map data storing means 102 so that the road map is displayed on the screen of the display means 105. Then, the accident/regulation information display processing is carried out at and after step ST302.

First, at step ST302, a decision is made whether the traffic information received by the traffic information receiving means 101 includes the accident/regulation information or not, and if it includes the accident/regulation information, the processing proceeds to step ST303. If a decision is made that it does not include the accident/regulation information, the accident/regulation information display processing is terminated.

At and after step ST303, the processing at and after step ST304 is carried out for each of the accident/regulation information which is received by the traffic information receiving means 101 and which is to be shown on the road map displayed on the screen of the display means 105 at step ST301.

For example, the processing at and after step ST304 is carried out as follows for the accident/regulation information on a particular road L0.

First, at step ST304, an accident/regulation mark C0 representing the contents of the accident/regulation is displayed at the start position of the accident/regulation section.

Next, at step ST305, an accident/regulation section indicating line TO is displayed such that it begins from the start position of the accident/regulation section and proceeds toward its end position to indicate the accident/regulation section along the road L0 and its direction.

After that, at step ST306, a decision is made whether the processing at and after step ST304 has been completed with the entire accident/regulation information to be displayed. If the decision result is positive, the accident/regulation information display processing is completed. If some accident/regulation information remains unprocessed, it undergoes the processing at and after step ST304.

According to the embodiment 3 described above, the accident/regulation section indicating line, which indicates the section and direction of the road subjected to the accident/regulation, is added as the traffic information additional symbol when displaying, as the traffic information representation, the accident/regulation mark representing the contents of the accident/regulation. This makes it possible to provide a traffic information display unit which enables the driver to easily recognize not only the contents of the accident/regulation and the section over which the accident/regulation is carried out, but also which of the up and down lanes undergoes the accident/regulation.

EMBODIMENT 4

Although the accident/regulation section indicating line, which indicates the section and direction of the road subjected to the accident/regulation, is added as the traffic information additional symbol to the accident/regulation mark displayed as the traffic information representation in the embodiment 3, an accident/regulation direction indicator can be added which shows the direction (up or down) of the road associated with the accident/regulation information instead of adding the accident/regulation section indicating line as the traffic information additional symbol.

Next, the operation of the embodiment 4 will be described.

Figure 11:
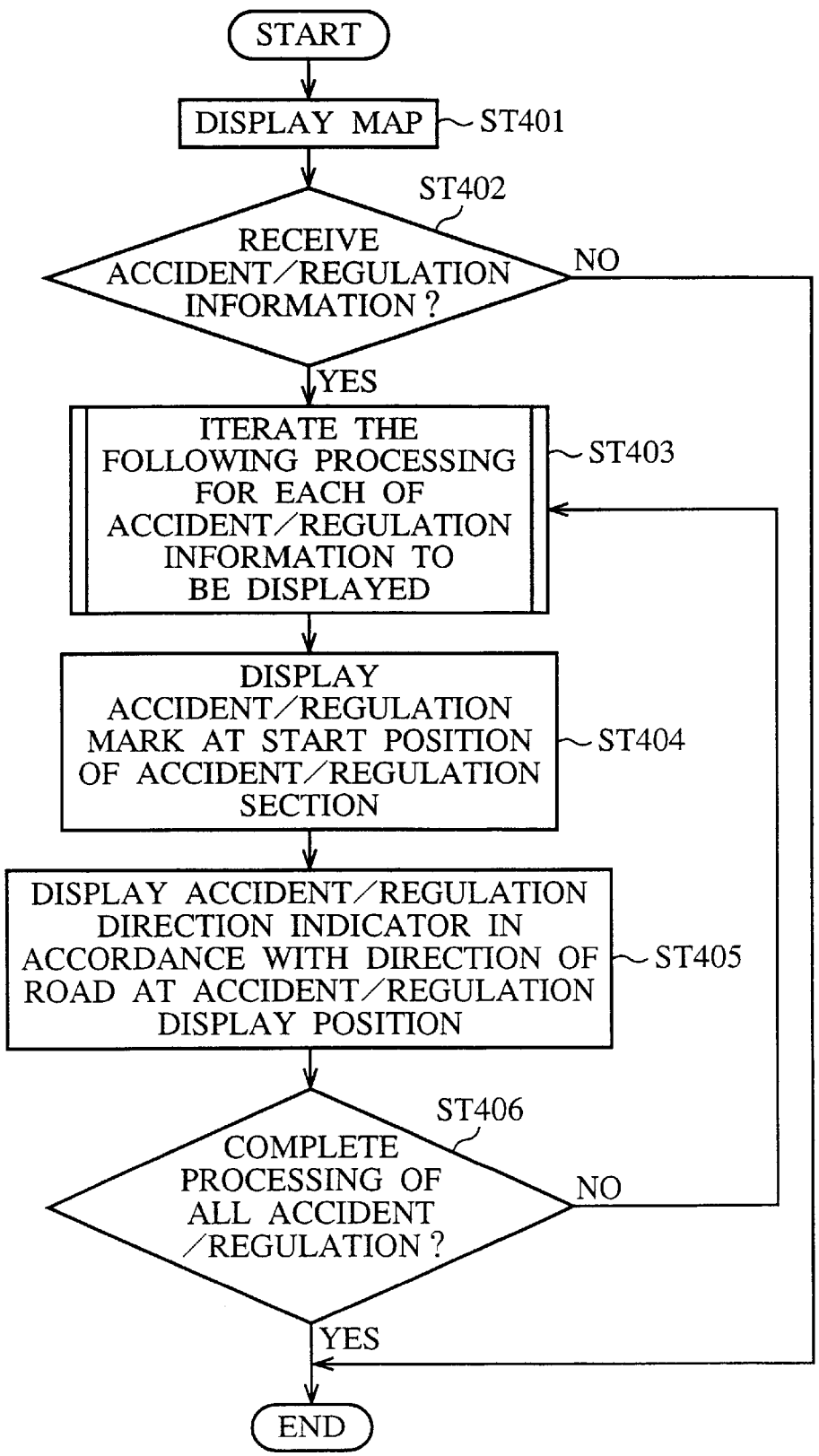
FIG. 11 is a flowchart illustrating the processing flow of an embodiment 4 of the traffic information display unit in accordance with the present invention.
Figure 12:
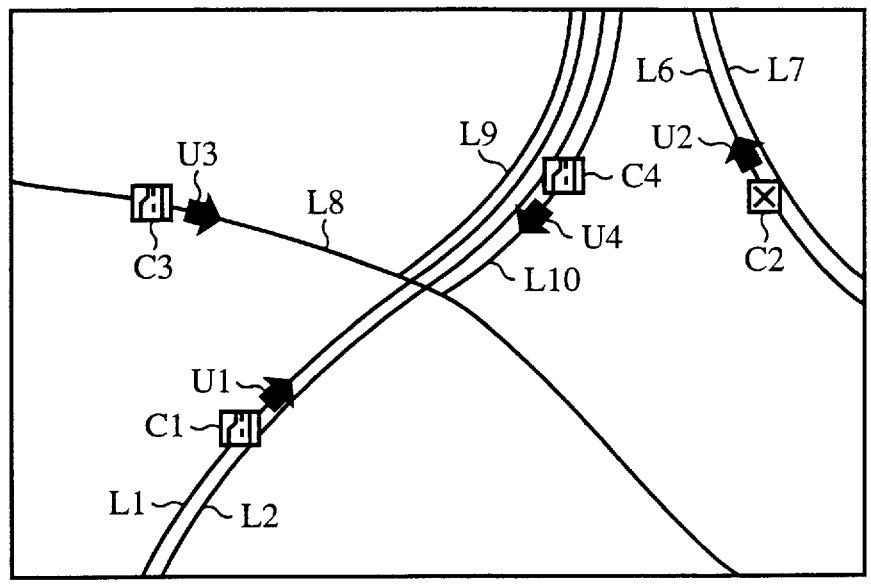
FIG. 12 is a diagram illustrating an example of a picture on a display means in the embodiment 4 of the traffic information display unit in accordance with the present invention.

FIG. 11 is a flowchart showing the processing flow of the embodiment 4 of the traffic information display unit in accordance with the present invention, and FIG. 12 is a diagram showing an example of a picture on the display means 105. In FIG. 12, the reference characters L1 and L2 each designate an interurban expressway (road); L6 and L7 each designate an intraurban expressway (road); L8 designates a national highway (road); L9 and L10 each designate a prefectural highway (road); C1 designates an accident/regulation mark (traffic information representation) representing the contents of the accident/regulation of the interurban expressway L1; U1 designates an accident/regulation direction indicator (traffic information additional symbol) added to the accident/regulation mark C1 to indicate the direction of the accident/regulation; C2 designates an accident/regulation mark (traffic information representation) representing the contents of the accident/regulation of the intraurban expressway L6; U2 designates an accident/regulation direction indicator (traffic information additional symbol) added to the accident/regulation mark C2 to indicate the direction of the accident/regulation; C3 designates an accident/regulation mark (traffic information representation) representing the contents of the accident/regulation of the national highway L8; U3 designates an accident/regulation direction indicator (traffic information additional symbol) added to the accident/regulation mark C3 to indicate the direction of the accident/regulation; C4 designates an accident/regulation mark (traffic information representation) representing the contents of the accident/regulation of the prefectural highway L10; and U4 designates an accident/regulation direction indicator (traffic information additional symbol) added to the accident/regulation mark C4 to indicate the direction of the accident/regulation. The operation of the embodiment will now be described referring to FIGS. 11 and 12.

First, at step ST401, the map data of a displayed area and its neighborhood is read from the map data storing means 102 so that the road map is displayed on the screen of the display means 105. Then, the accident/regulation information display processing is carried out at and after step ST402.

First, at step ST402, a decision is made whether the traffic information received by the traffic information receiving means 101 includes the accident/regulation information or not, and if it includes the accident/regulation information, the processing proceeds to step ST403. If a decision is made that it does not include the accident/regulation information, the accident/regulation information display processing is terminated.

At and after step ST403, the processing at and after step ST404 is carried out for each of the accident/regulation information which is received by the traffic information receiving means 101 and which is to be shown on the road map displayed on the screen of the display means 105 at step ST401.

For example, the processing at and after step ST404 is carried out as follows for the accident/regulation information on a particular road L0.

First, at step ST404, an accident/regulation mark C0 representing the contents of the accident/regulation is displayed at the start position of the accident/regulation section.

Next, at step ST405, an accident/regulation direction indicator U0 representing the direction of the road subjected to the accident/regulation is displayed in accordance with the direction of the road to which the accident/regulation mark C0 is attached.

After that, at step ST406, a decision is made whether the processing at and after step ST404 has been completed with the entire accident/regulation information to be displayed. If the decision result is positive, the accident/regulation information display processing is completed. If some accident/ regulation information remains unprocessed, it undergoes the processing at and after step ST404.

According to the embodiment 4 described above, the accident/regulation direction indicator, which indicates the direction of the road subjected to the accident/regulation, is added to the accident/regulation mark representing the contents of the accident/regulation. This makes it possible to provide a traffic information display unit which enables the driver to easily recognize not only the contents of the accident/regulation, but also which of the up and down lanes undergoes the accident/regulation.

EMBODIMENT 5

Although the foregoing embodiment 3 does not alter the display mode of the traffic information additional symbol in accordance with the road type, the display mode of the accident/regulation section indicating line displayed as the traffic information additional symbol on the traffic information display unit of the embodiment 3 can be altered in accordance with the corresponding road type as in the embodiment 2.

When displaying the accident/regulation mark as the traffic information representation corresponding to the received accident/regulation information, the present embodiment 5 not only displays the accident/regulation section indicating line representing the accident/regulation section and its direction as the traffic information additional symbol as in the embodiment 3, but also alters the display mode of the accident/regulation section indicating line in accordance with the road type subjected to the accident/regulation as in the embodiment 2. Thus, the embodiment 5 includes, besides the traffic information additional symbol adding means as shown in FIG. 8 of the embodiment 3, the road type associated traffic information additional symbol display mode control means for altering the display mode of the accident/regulation section indicating line in accordance with the road type corresponding to the accident/regulation information, in the image converting means 103 implemented with the CPU 207, ROM 208 and RAM 209 and so on.

Next, the operation of the embodiment 5 will be described.

Figure 14:
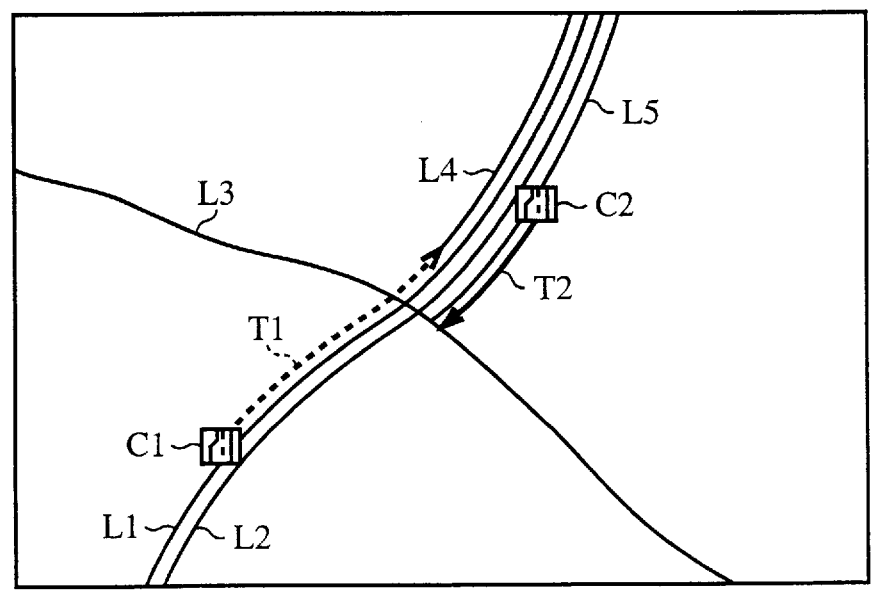
FIG. 14 is a diagram illustrating an example of a picture on a display means in the embodiment 5 of the traffic information display unit in accordance with the present invention.
Figure 13:
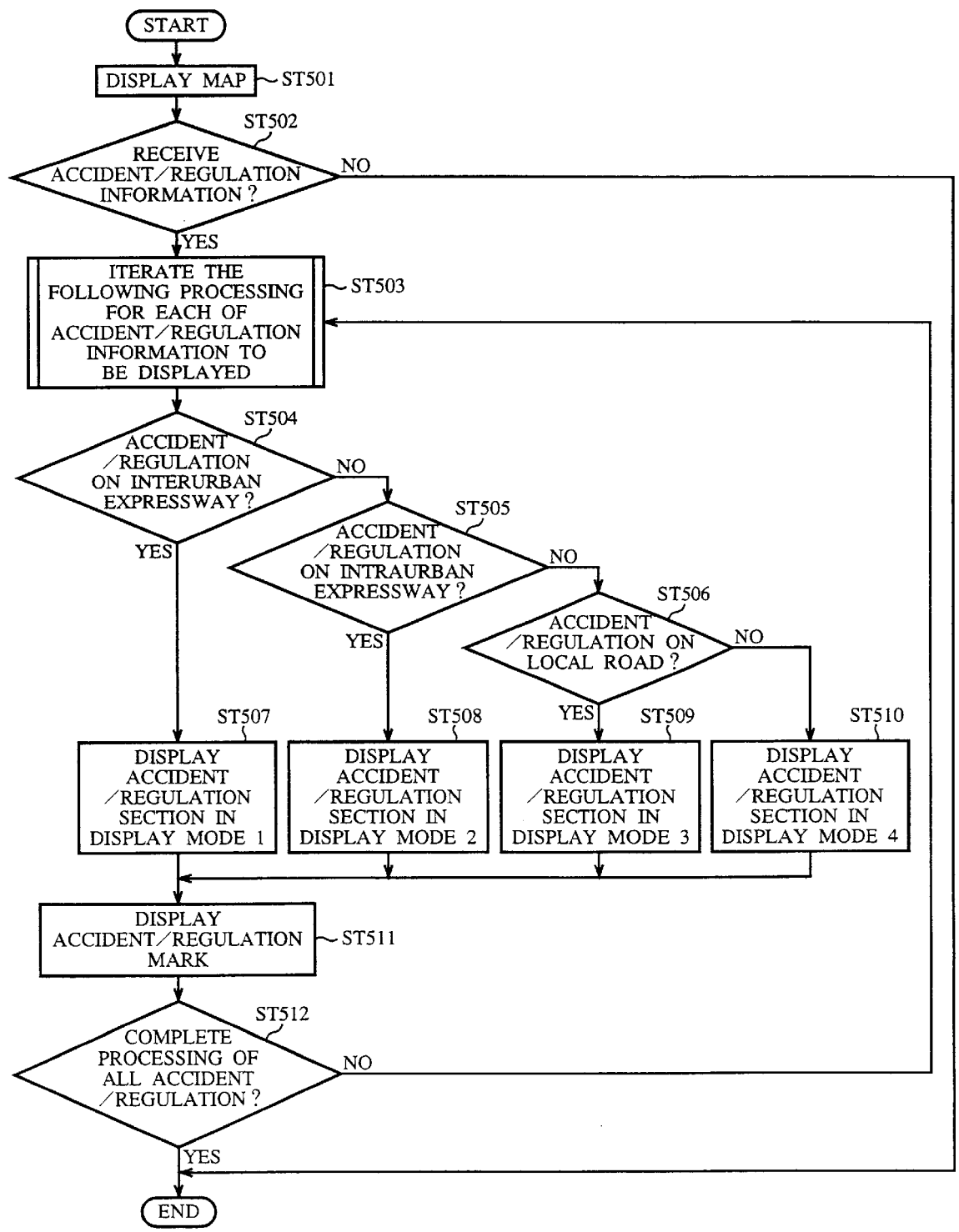
FIG. 13 is a flowchart illustrating the processing flow of an embodiment 5 of the traffic information display unit in accordance with the present invention.

FIG. 13 is a flowchart showing the processing flow of the embodiment 5 of the traffic information display unit in accordance with the present invention, and FIG. 14 is a diagram illustrating an example of a picture on the display means 105. In FIG. 14, the reference characters L1 and L2 each designate an interurban expressway (road); L3, L4 and L5 each designate a local road (road), C1 designates an accident/regulation mark (traffic information representation) representing the contents of the accident/regulation of the interurban expressway L1, T1 designates an accident/regulation section indicating line (traffic information additional symbol) representing the accident/regulation section of the interurban expressway L1, C2 designates an accident/regulation mark (traffic information representation) representing the contents of the accident/regulation of the local road L5, and T2 designates an accident/regulation section indicating line (traffic information additional symbol) representing the accident/regulation section of the local road L5. The operation of the embodiment will now be described referring to FIGS. 13 and 14.

First, at step ST501, the map data of a displayed area and its neighborhood is read from the map data storing means 102 so that the road map is displayed on the screen of the display means 105. Then, the accident/regulation information display processing is carried out at and after step ST502.

First, at step ST502, a decision is made whether the traffic information received by the traffic information receiving means 101 includes the accident/regulation information or not, and if it includes the accident/regulation information, the processing proceeds to step ST503, whereas if it does not include the accident/regulation information, the accident/regulation information display processing is terminated.

At and after step ST503, the processing at and after step ST504 is carried out for each of the accident/regulation information which is received by the traffic information receiving means 101 and which is to be shown on the road map displayed on the screen of the display means 105 at step ST501.

For example, the processing at and after step ST504 is carried out as follows for the accident/regulation information on a particular road L0.

First, at step ST504, a decision is made whether the type of the road L0 is an interurban expressway or not. If the type of the road L0 is the interurban expressway, the processing proceeds to step ST507, and if not, it proceeds to step ST505.

Then, at step ST505, a decision is made whether the type of the road L0 is an intraurban expressway or not. If the type of the road L0 is the intraurban expressway, the processing proceeds to step ST508, and if not, it proceeds to step ST506.

Subsequently, at step ST506, a decision is made whether the type of the road L0 is a local road or not. If the type of the road L0 is the local road, the processing proceeds to step ST509, and if not, it proceeds to step ST510.

It is possible for the foregoing steps ST504–ST506 to use either the information stored in the map data storing means 102 or the link division information included in the accident/regulation information received by the traffic information receiving means 101 for making a decision of the type of the road L0, as in the embodiment 1.

Then, at one of steps ST507–ST510, the accident/regulation section indicating line TO is displayed in the display mode corresponding to the road type, and the processing proceeds to step ST511.

In this case, the accident/regulation section indicating line TO is displayed in the display mode 1 (dashed-and-two-dotted line, for example) at step ST507, in the display mode 2 (dashed-and-dotted line, for example) at step ST508, in the display mode 3 (broken line, for example) at step ST509 and in the display mode 4 (solid line, for example) at step ST510.

It is possible to provide different road types with the same display representation in such a manner as indicating the display modes 1 and 2 at steps ST507 and ST508 using a broken line, and the display modes 3 and 4 at steps ST509 and ST510 using a solid line.

Next, at step ST511, an accident/regulation mark C0 is displayed at the start position of the accident/regulation section in accordance with the contents of the accident/regulation.

After that, at step ST512, a decision is made whether the processing at and after step ST504 has been completed with the entire accident/regulation information to be displayed. If the decision result is positive, the accident/regulation information display processing is completed. If some accident/regulation information remains unprocessed, it undergoes the processing at and after step ST504.

According to the embodiment 5 described above, the accident/regulation section indicating symbol, which indicates the section and direction of the road subjected to the accident/regulation, is added as the traffic information additional symbol to the accident/regulation mark representing the contents of the accident/regulation when displaying the accident/regulation mark as the traffic information representation. This makes it possible for a driver to easily recognize not only the contents of the accident/regulation, but also which of the up and down lanes undergoes the accident/regulation. In addition, since the display mode of the accident/regulation section indicating line is altered in accordance with the type of the road subjected to the accident/regulation, it becomes possible for the driver to easily recognize the type of the road undergoing the accident/regulation by merely watching the accident/regulation section indicating line. Thus, a traffic information display unit can be provided which enables the driver to identify the accident/regulation information easily in connection with the roads.

EMBODIMENT 6

Although the foregoing embodiment 4 does not alter the display mode of the traffic information additional symbol in accordance with the road type, the display mode of the accident/regulation direction indicator displayed as the traffic information additional symbol on the traffic information display unit of the embodiment 4 can be altered in accordance with the corresponding road type as in the embodiment 2.

When displaying the accident/regulation mark as the traffic information representation corresponding to the received accident/regulation information, the present embodiment 6 not only displays the accident/regulation direction indicator representing the direction of the road undergoing the accident/regulation as the traffic information additional symbol as in the embodiment 4, but also alters the display mode of the accident/regulation direction indicator in accordance with the road type subjected to the accident/regulation as in the embodiment 2.

Next, the operation of the embodiment 6 will be described.

Figure 15:
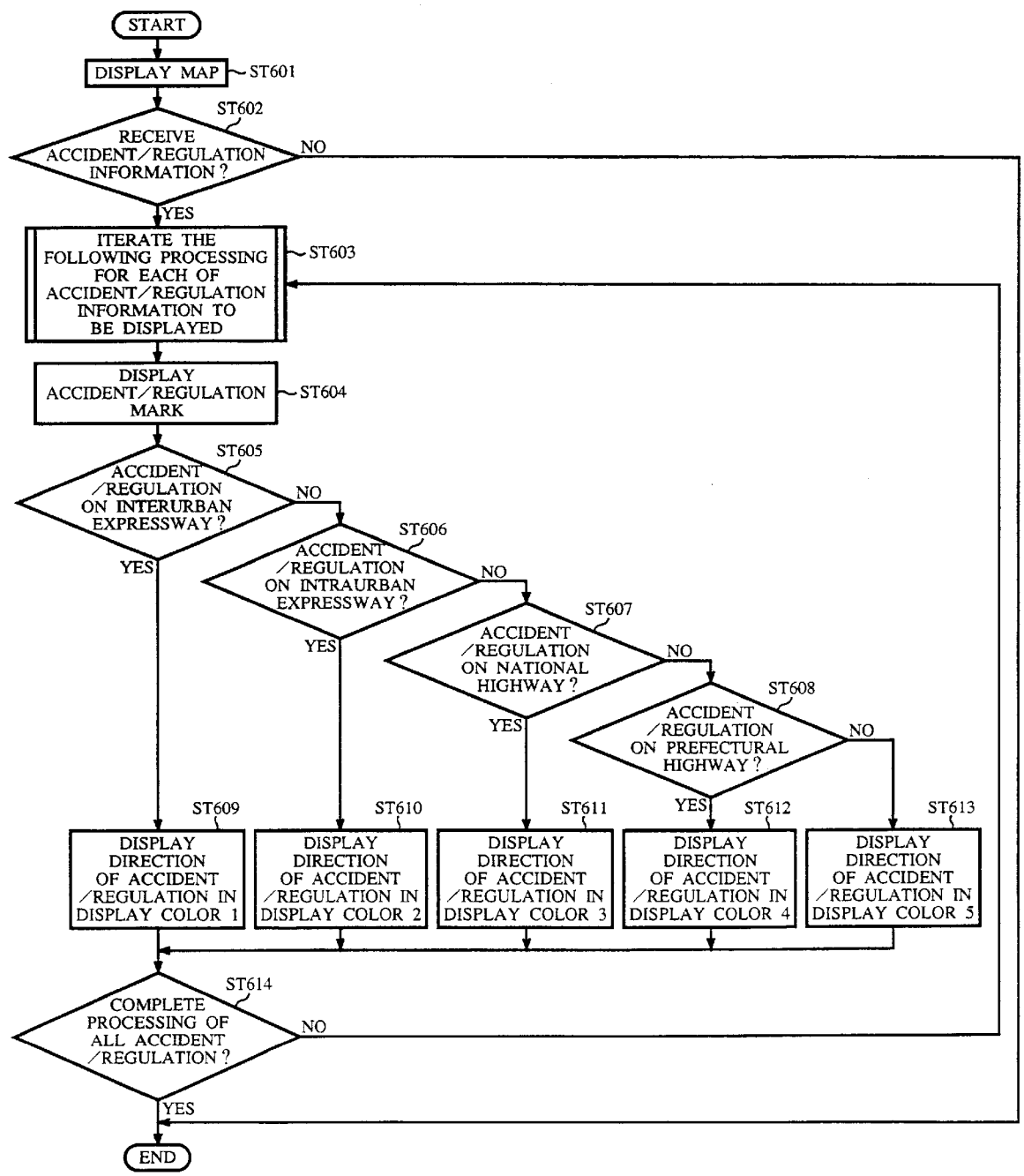
FIG. 15 is a flowchart illustrating the processing flow of an embodiment 6 of the traffic information display unit in accordance with the present invention.
Figure 16:
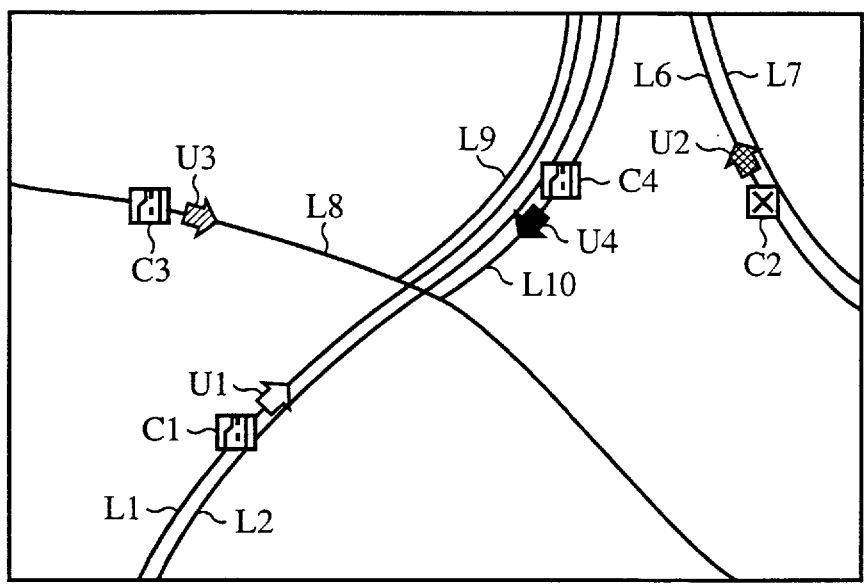
FIG. 16 is a diagram illustrating an example of a picture on a display means in the embodiment 6 of the traffic information display unit in accordance with the present invention.
Figure 17:
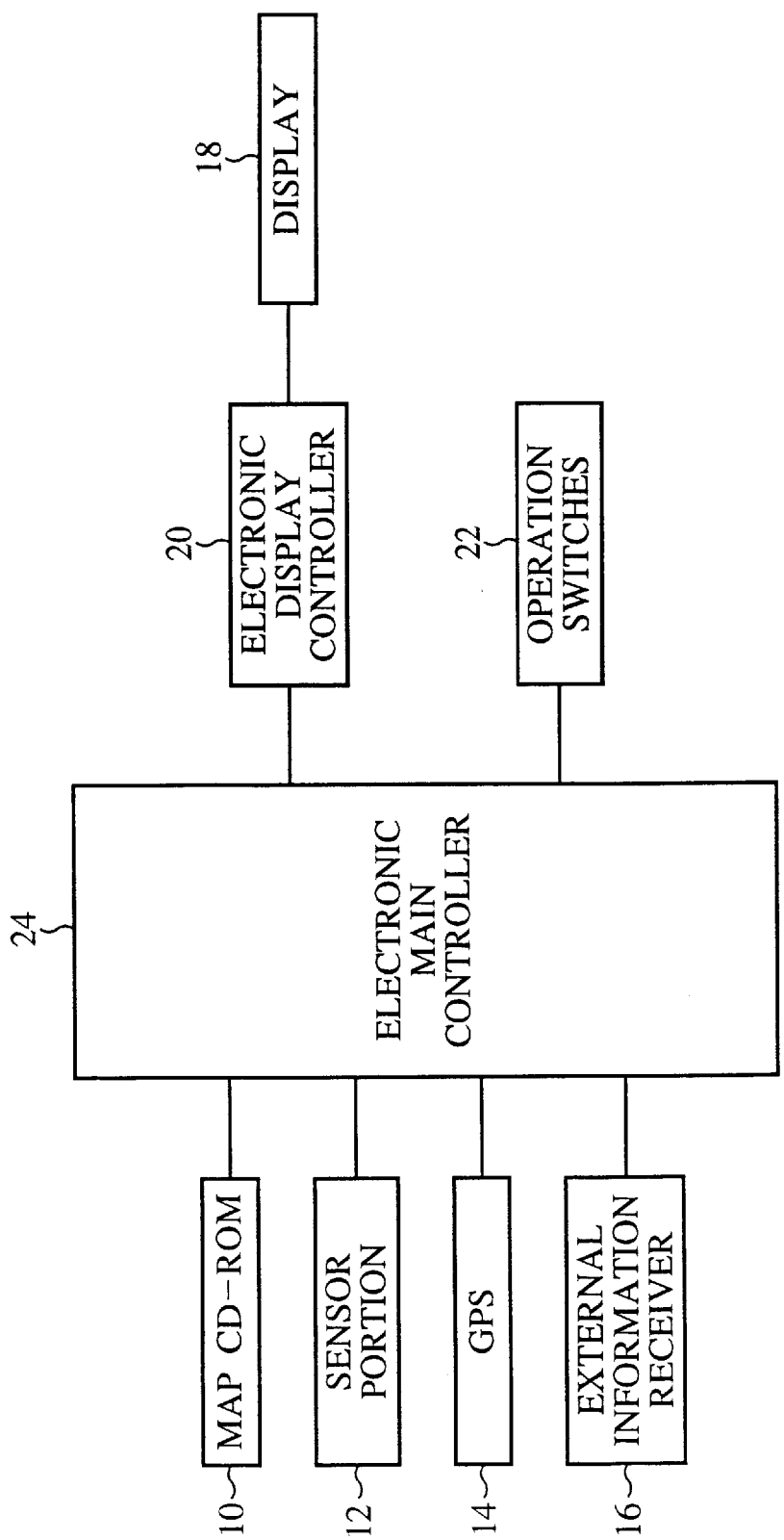
FIG. 17 is a block diagram showing a conventional traffic information display unit.
Figure 18:
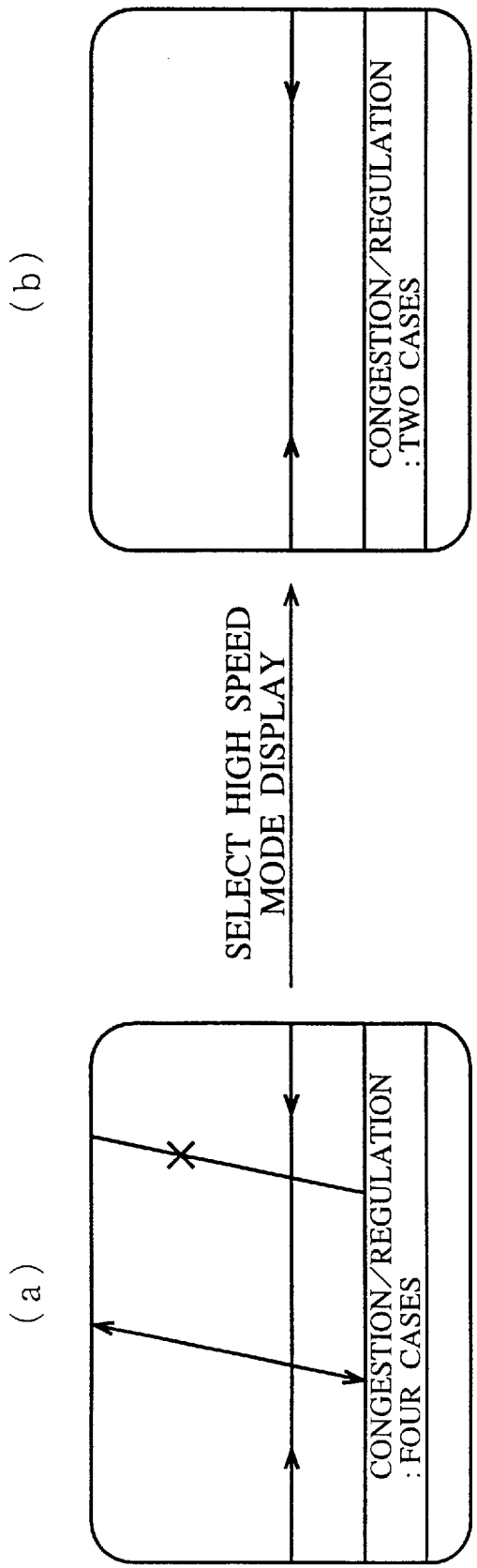
FIG. 18 is a diagram showing examples of pictures on the conventional traffic information display unit.

FIG. 15 is a flowchart showing the processing flow of the embodiment 6 of the traffic information display unit in accordance with the present invention, and FIG. 16 is a diagram showing an example of a picture on the display means 105. In FIG. 16, the reference characters L1 and L2 each designate an interurban expressway (road); L6 and L7 each designate an intraurban expressway (road); L8 designates a national highway (road); L9 and L10 each designates a prefectural highway (road); C1 designates an accident/regulation mark (traffic information representation) representing the contents of the accident/regulation of the interurban expressway L1; U1 designates an accident/regulation direction indicator (traffic information additional symbol) added to the accident/regulation mark C1 to indicate the direction of the accident/regulation; C2 designates an accident/regulation mark (traffic information representation) representing the contents of the accident/regulation of the intraurban expressway L6; U2 designates an accident/regulation direction indicator (traffic information additional symbol) added to the accident/regulation mark C2 to indicate the direction of the accident/regulation; C3 designates an accident/regulation mark (traffic information representation) representing the contents of the accident/regulation of the national highway L8; U3 designates an accident/regulation direction indicator (traffic information additional symbol) added to the accident/regulation mark C3 to indicate the direction of the accident/regulation; C4 designates an accident/regulation mark (traffic information representation) representing the contents of the accident/regulation of the prefectural highway L10; and U4 designates an accident/regulation direction indicator (traffic information additional symbol) added to the accident/regulation mark C4 to indicate the direction of the accident/regulation. The operation of the embodiment will now be described referring to FIGS. 15 and 16.

First, at step ST601, the map data of a displayed area and its neighborhood is read from the map data storing means 102 so that the road map is displayed on the screen of the display means 105. Then, the accident/regulation information display processing is carried out at and after step ST602.

First, at step ST602, a decision is made whether the traffic information received by the traffic information receiving means 101 includes the accident/regulation information or not. If it includes the accident/regulation information, the processing proceeds to step ST603, and if it does not include the accident/regulation information, the accident/regulation information display processing is terminated.

At and after step ST603, the processing at and after step ST604 is carried out for each of the accident/regulation information which is received by the traffic information receiving means 101 and which is to be shown on the road map displayed on the screen of the display means 105 at step ST601.

For example, the processing at and after step ST604 is carried out as follows for the accident/regulation information on a particular road L0.

First, at step ST604, an accident/regulation mark C0 is displayed, for example, at the start position of the accident/regulation section in accordance with the contents of the accident/regulation information, and the processing proceeds to step ST605.

Next, at step ST605, a decision is made whether the type of the road L0 is an interurban expressway or not. If the type of the road L0 is the interurban expressway, the processing proceeds to step ST609, and if not, it proceeds to step ST606.

Then, at step ST606, a decision is made whether the type of the road L0 is an intraurban expressway or not. If the type of the road L0 is the intraurban expressway, the processing proceeds to step ST610, and if not, it proceeds to step ST607.

Subsequently, at step ST607, a decision is made whether the type of the road L0 is a national highway or not. If the type of the road L0 is the national highway, the processing proceeds to step ST611, and if not, it proceeds to step ST608.

Then, at step ST608, a decision is made whether the type of the road L0 is a prefectural highway or not. If the type of the road L0 is the prefectural highway, the processing proceeds to step ST612, and if not, it proceeds to step ST613.

Subsequently, at one of step ST609–ST613, an accident/regulation direction indicator U0 is displayed such that it corresponds to the accident/regulation mark C0 in the display mode in accordance with the road type, and the processing proceeds to step ST614.

In this case, the accident/regulation direction indicator U0 is displayed in a display color 1 (blue, for example) at step ST609, in a display color 2 (sky blue, for example) at step ST610, in a display color 3 (red, for example) at step ST611, in a display color 4 (green, for example) at step ST612, and in a display color 5 (brown, for example) at step ST613.

It is possible to provide different road types with the same display mode in such a manner as representing the display modes at steps ST609 and ST610 using blue, and the display modes at steps ST611–ST613 using green.

After that, at step ST614, a decision is made whether the processing at and after step ST604 has been completed with the entire accident/regulation information to be displayed. If the decision result is positive, the accident/regulation information display processing is completed. If some accident/regulation information remains unprocessed, it undergoes the processing at and after step ST604.

According to the embodiment 6 described above, the accident/regulation direction indicator, which indicates the direction of the road subjected to the accident/regulation, is added as the traffic information additional symbol to the accident/regulation mark representing the contents of the accident/regulation when displaying the accident/regulation mark as the traffic information representation. This makes it possible for a driver to easily recognize not only the contents of the accident/regulation, but also which of the up and down lanes undergoes the accident/regulation. In addition, since the display mode of the accident/regulation direction indicator is altered in accordance with the type of the road subjected to the accident/regulation, it becomes possible for the driver to easily recognize the type of the road undergoing the accident/regulation by merely watching the accident/regulation direction indicator. Thus, a traffic information display unit can be provided which enables the driver to identify the accident/regulation information easily in connection with the roads.

EMBODIMENT 7

Although the foregoing embodiments 5 and 6 alter the display mode of the accident/regulation section indicating line and the accident/regulation direction indicator adopted as the traffic information additional symbol without altering the display mode of the accident/regulation mark used as the symbolic traffic information representation when displaying the accident/regulation information, the display mode of the accident/regulation mark as the traffic information representation can also be altered in accordance with the road type by changing its color, for example. In this case, the driver can also easily recognize the type of the road undergoing the accident/regulation by merely watching the accident/regulation mark as the traffic information representation. Thus, a traffic information display unit can be provided which enables the driver to identify the accident/regulation information easily in connection with the roads.

EMBODIMENT 8

Although the display mode of the traffic information representation or the traffic information additional symbol is altered by the difference in line types or colors in the foregoing embodiments 1, 5, 6 and 7, a method for altering the display mode is not limited to them. For example, it can be achieved by the difference in brightness, by blinking and non-blinking display, or the difference in the speed of blinking, and so on.

What is claimed is:

1. A traffic information display unit comprising
   map data storing means for storing map data used for displaying a map;
   traffic information receiving means for receiving traffic information;
   display means for displaying a map using said map data and for displaying on the displayed map a traffic information representation based on said traffic information received by said traffic information receiving means; and
   road type associated traffic information display mode control means for altering a display mode of said traffic information representation in accordance with a type of a road associated with said traffic information when displaying said traffic information representation.

2. The traffic information display unit as claimed in claim 1, wherein said road type associated traffic information display mode control means alters said display mode of said traffic information representation by changing a type of a line used to display said traffic information representation, said line being placed along the road associated with said traffic information.

3. The traffic information display unit as claimed in claim 2, wherein said traffic information used for displaying said traffic information representation is congestion information.

4. The traffic information display unit as claimed in claim 1, wherein said road type associated traffic information display mode control means alters said display mode of said traffic information representation by changing a color of a line used to display said traffic information representation, said line being placed along the road associated with said traffic information.

5. The traffic information display unit as claimed in claim 4, wherein said traffic information used for displaying said traffic information representation is congestion information.

6. The traffic information display unit as claimed in claim 1, wherein said road type associated traffic information display mode control means alters said display mode of said traffic information representation, which is displayed in a symbolic pattern at a position associated with said traffic information, by changing a color of said traffic information representation displayed in the symbolic pattern.

7. The traffic information display unit as claimed in claim 6, wherein said traffic information used for displaying said traffic information representation is accident/regulation information.

8. A traffic information display unit comprising:
   map data storing means for storing map data used for displaying a map;
   traffic information receiving means for receiving traffic information;
   display means for displaying a map using said map data and for displaying on the displayed map a traffic information representation based on said traffic information received by said traffic information receiving means; and
   road type associated traffic information additional symbol display mode control means for altering a display mode of a traffic information additional symbol, which is displayed in addition to said traffic information representation, in accordance with a type of a road associated with said traffic information when displaying said traffic information representation.

9. The traffic information display unit as claimed in claim 8, wherein said traffic information additional symbol is a road type symbol representing said type of the road associated with said traffic information.

10. A traffic information display unit, comprising:
    map data storing means for storing map data used for displaying a map;
    traffic information receiving means for receiving traffic information;
    display means for displaying a map using said map data and for displaying on the displayed map an accident/regulation mark based on accident/regulation information in said traffic information received by said traffic information receiving means; and traffic information additional symbol adding means for adding a traffic information additional symbol indicating a direction of a road associated with said accident/regulation information when displaying said accident/regulation mark, wherein said traffic information additional symbol adding means adds as said traffic information additional symbol an accident/regulation section indicating line displayed along said road associated with said accident/regulation information to indicate an accident/regulation section and a direction of said road.

11. The traffic information display unit as claimed in claims 10, further comprising road type associated traffic information additional symbol display mode control means for altering a display mode of said traffic information additional symbol in accordance with the type of a road associated with said accident/regulation information.

12. A traffic information display unit, comprising:

map data storing means for storing map data used for displaying a map;

traffic information receiving means for receiving traffic information;

display means for displaying a map using said map data and for displaying on the displayed map an accident/regulation mark based on accident/regulation information in said traffic information received by said traffic information receiving means; and traffic information additional symbol adding means for adding a traffic information additional symbol indicating a direction of a road associated with said accident/regulation information when displaying said accident/regulation mark, and further comprising road type associated traffic information additional symbol display mode control means for altering a display mode of said traffic information additional symbol in accordance with the type of a road associated with said accident/regulation information.

13. A traffic information display unit, comprising:

map data storing means for storing map data used for displaying a map;

traffic information receiving means for receiving traffic information;

display means for displaying a map using said map data and for displaying on the displayed map an accident/regulation mark based on accident/regulation information in said traffic information received by said traffic information receiving means; and traffic information additional symbol adding means for adding a traffic information additional symbol indicating a direction of a road associated with said accident/regulation information when displaying said accident/regulation mark, and further comprising road type associated traffic information additional symbol display mode control means for altering a display mode of said traffic information additional symbol in accordance with the type of a road associated with said accident/regulation information.

* * * * *